United States Patent [19]

Jensen

[11] Patent Number: 5,003,913
[45] Date of Patent: Apr. 2, 1991

[54] CHAIN ELONGATION INDICATOR AND METHOD

[76] Inventor: David G. Jensen, 120 Granada Dr., Apt. #15, Mountain View, Calif. 94043

[21] Appl. No.: 364,148

[22] Filed: Jun. 12, 1989

[51] Int. Cl.⁵ .................. G01D 21/00; G01B 5/02
[52] U.S. Cl. .................................... 116/208; 116/200
[58] Field of Search .............. 116/200, 208, 212, 278, 116/DIG. 34; 33/501, 501.4, 700, 712, 805; 73/862.39

[56] References Cited

U.S. PATENT DOCUMENTS

| | | | |
|---|---|---|---|
| 2,071,694 | 2/1937 | Howe | 73/828 |
| 3,998,317 | 12/1976 | Stinnett | 198/341 |
| 4,092,781 | 6/1978 | Blake | 33/501.4 |
| 4,151,652 | 5/1979 | Palma | 33/679.1 |
| 4,198,758 | 4/1980 | Eineichner et al. | 33/700 |
| 4,348,907 | 9/1982 | Giese | 73/862.39 |
| 4,365,420 | 12/1982 | Walden | 33/202 |

Primary Examiner—William A. Cuchlinski, Jr.
Assistant Examiner—W. Morris Worth
Attorney, Agent, or Firm—Baker & Daniels

[57] ABSTRACT

Chain elongation indicator and method for use with a chain having a first link reference point on a first link and a second link reference point on a second link. The indicator includes an indicator body having first and second indicator reference points, such that the distance between said first and second indicator reference points corresponds to a predetermined percentage distance between first and second link reference points of a non-elongated chain. The first indicator reference point is aligned with the first link reference point on the first link of the chain, and the second link reference point is aligned with the second link reference point on the second link of the chain, so that the distance between the first link reference point and the second link reference point may be observed.

3 Claims, 2 Drawing Sheets

CHAIN ELONGATION INDICATOR AND METHOD

FIELD OF THE INVENTION

The invention relates to devices that measure chain elongation, particularly in chain-driven vehicles and equipment.

BACKGROUND OF THE INVENTION

One method of determining that a chain has become worn and is in need of replacement is by measuring the amount by which the chain has become elongated from its original length. This measurement is particularly important in applications in which the links of the chain are adapted to engage one or more sprockets, as in a bicycle or motorcycle, or chain-driven equipment. In such systems, the distance between adjacent links of the chain must match the distance between adjacent teeth on the sprocket in order for the force from the chain links to be evenly distributed across all of the teeth engaged by the chain links. If a chain becomes elongated, then only a few of the links will drive (or be driven by) the sprocket teeth, and the remaining links will be slightly spaced between adjacent teeth. An elongated chain will slip on the sprockets and this slippage will cause frictional and impact wear on the sprockets, thereby damaging the sprockets. For a bicycle rider, chain slippage will result in some discomfort because peddling the bicycle is less smoothly accomplished. Further, as elongation worsens, chain slippage worsens, damage to the sprockets increases, and the chain becomes unusable. It is therefore desirable to accurately measure the elongation of a chain so that a chain may be replaced before detrimental slippage on sprockets occurs.

One device that measures chain wear is disclosed in Stinnett U.S. Pat. No. 3,998,317. Stinnett discloses a chain wear indicator for conveyor chains. The Stinnett device measures the wear of individual links of a chain by inserting a tapered projection into the gap between links until the sides of the projection engage the opposite sides of the gap. The further the tapered projection is inserted before it engages the sides of the gap, the greater the distance between the links. However, the Stinnett device only measures the width of the gap between two individual links, which is not necessarily an indication of chain elongation.

OBJECTS OF THE INVENTION

One object of the invention is to provide a chain elongation indicator device and method.

Another object of the invention is to provide a chain elongation indicator that is simple to use.

Another object of the invention is to provide an inexpensive chain elongation indicator.

Still other objects and advantages of the invention will become apparent to those of skill in the art after reading the following description of a preferred embodiment.

SUMMARY OF INVENTION

The invention comprises a chain elongation indicator and method, for use with a chain having a first link reference point on a first link and a second link reference point on a second link. The indicator includes an indicator body having first and second indicator reference points, such that the distance between the first and second indicator reference of the points corresponds to a predetermined percentage of the distance between first and second link reference points of a non-elongated chain. The first indicator reference point is aligned with the first link reference point on the first link of the chain, and the second indicator reference point is aligned with the second link reference point on the second link on the chain, so that the distance between the first link reference point and the second link reference point may be observed.

DETAILED DESCRIPTION OF THE INVENTION

Figure 1:
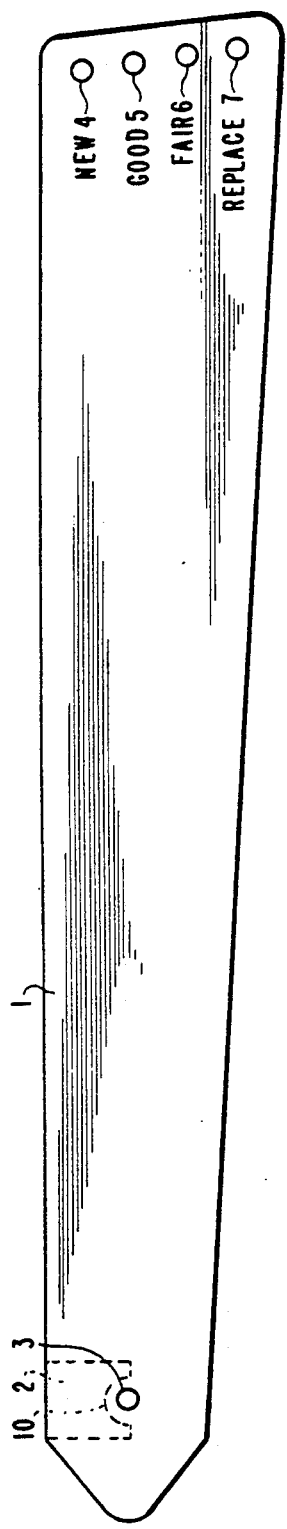
FIG. 1 is a front view of the chain elongation indicator.
Figure 2:
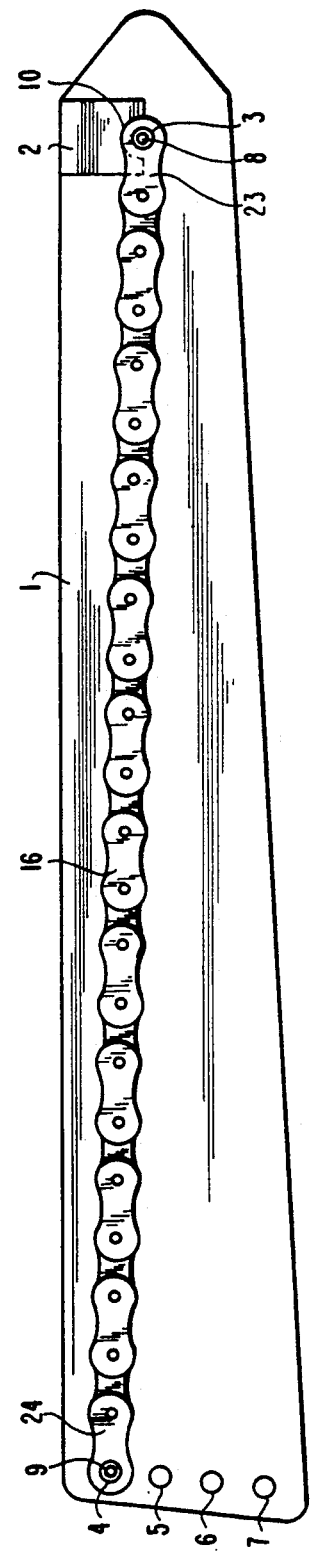
FIG. 2 is a back view of the chain elongation indicator.
Figure 3:
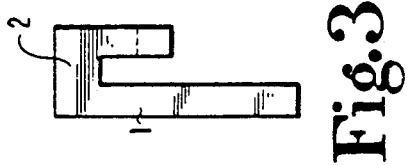
FIG. 3 is a side view of the chain elongation indicator showing an extension adapted to receive a link of a chain to be measured.

FIG. 1 shows the front side of the device. The chain elongation indicator body 1 is stamped out of stainless steel in one piece (integrally formed), which includes a notched extension 2 (FIGS. 1, 2 and 3). Indicator body 1 has a first indicator reference point 3, which in the preferred embodiment comprises a hole. Indicator body 1 also has four second indicator reference points 4, 5, 6, and 7, which, in the preferred embodiment, are also comprised of holes.

Figure 5:
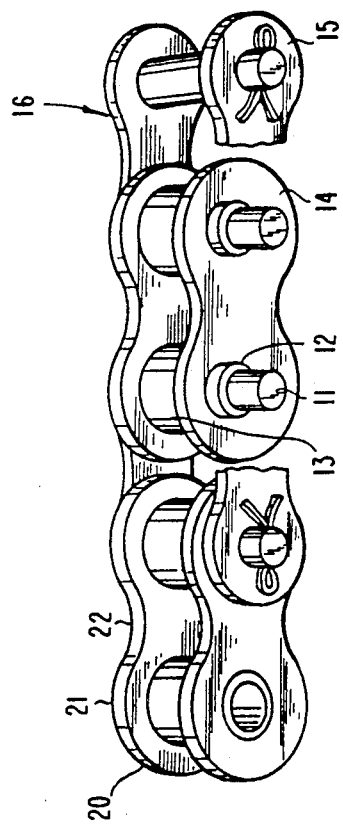
FIG. 5 is a perspective view of a portion of a typical chain which may be measured using the invention.

FIG. 5 shows a typical construction for a chain 16. The component parts of a chain link are a pin 11, bushing 12, roller 13, and linkplates 14 and 15. Alternate link plates are either roller (outer) linkplates 14 or pin (inner) linkplates 15. To use the invention, a first link reference point 8 on a first link 23 and a second link reference point 9 on a second link 24 must be identified (FIG. 2). In the preferred method of the invention, pins 8 and 9 of links 23 and 24, respectively, are used as first and second link reference points.

The distance between the first indicator reference point 3 and each of the second indicator reference points 4, 5, 6 and 7 corresponds to a different predetermined percentage of the distance between first link reference point 8 and second link reference point 9 in a non-elongated chain. In FIG. 2, the distance between first indicator reference point 3 and second indicator reference point 4 is equal to 100% of the distance between first link reference point 8 and second link reference point 9 in a non-elongated chain.

Therefore, when a non-elongated chain is stretched into a substantially straight position and first link reference point 8 is aligned with first indicator reference point 3, second link reference point 9 will align with second indicator reference point 4 (FIG. 2). When viewed through the front of the indicator body, both pins 8 and 9 will be visible through reference points 3 and 4, respectively. However, if the chain has elongated, second link reference point 9 will not be fully visible through hole 4.

In the preferred embodiment, exemplified by a chain elongation indicator for a bicycle, additional second indicator reference points 5, 6 and 7 are provided so that the extent of elongation may be more accurately measured. Such measurement is accomplished by pivoting indicator body 1 about first indicator reference point 3 so that the first link reference point 8 remains visible through indicator reference point 3, and second link reference point 9 becomes visible through one of second indicator reference points 4, 5, 6 or 7, which are sequentially positioned on indicator body 1. The second indicator reference points 5, 6, and 7 are each a greater distance from first indicator reference point 3 than second indicator reference point 4. Specifically, the distance from first indicator reference point 3 to second indicator reference point 5 is 100.33% of the distance between reference points 3 and 4; the distance from first indicator reference point 3 to second indicator reference point 6 is 100.67% of the distance between reference points 3 and 4; and the distance from first indicator reference point 3 to second indicator reference point 7 is 101% of the distance between reference points 3 and 4. Therefore, when a chain has elongated by 1% from its original length, first and second link reference points (pins) 8 and 9 will be simultaneously visible through first and second indicator reference points (holes) 3 and 7, respectively. Intermediate indicator reference points 5 and 6 allow one to more easily determine that a chain is beginning to elongate, when it has not yet elongated by 1%. A bicycle chain should be replaced when elongation reaches one percent (1%). Also, qualitative descriptions of a chain's condition are written on indicator body 1 next to second indicator reference points 4, 5, 6, and 7 (shown in FIG. 1 for a bicycle chain).

In the preferred embodiment, notched extension 2 (FIGS. 1, 2 and 3) is provided so that first link reference point 8 may be easily aligned with first indicator reference point 3. Notch 10 in notched extension 2 receives roller 13 (FIG. 5), thereby aligning first link reference point 8 with first indicator reference point 3 (FIG. 2).

Figure 4:
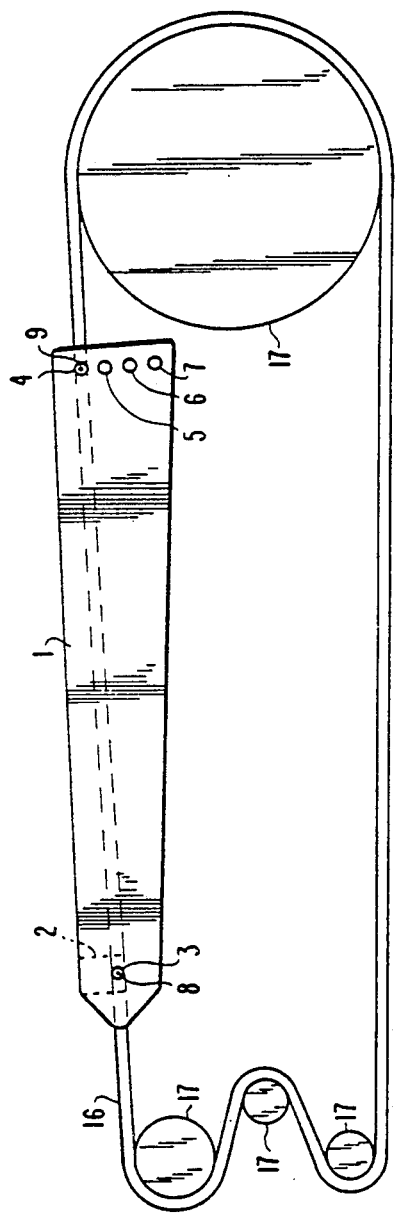
FIG. 4 is a front view showing how the chain elongation indicator may be used while a bicycle chain is on a bicycle.

FIG. 4 shows how the chain elongation indicator may be used while a bicycle chain is on a bicycle (Only chain 16 and sprocket wheels 17 of the bicycle are shown.). When notch 10 receives roller 13 (see FIG. 5), first link reference point (pin) 8 may be observed through first indicator reference point (hole) 3. The opposite end of indicator body 1 is then rotated until second link reference point (pin) 9 is visible from one of the second indicator reference points (holes) 4, 5, 6, or 7. By observing the distance, if any, between second link reference point (pin) 9 and indicator reference points 4, 5, 6 or 7, the elongation of the chain may be measured.

Other variations of this invention are possible. For example, the device may be stamped from other metals, such as aluminum or tool steel, or may be fashioned from molded plastic. Notched extension 2 may also be a separate piece, which is glued or soldered (if the device is metal) to indicator body 1.

The device may be used with any chain in which at least two links each have link reference points. Although in the preferred embodiment the link pins are used as link reference points, it is also possible to use other portions of the links as reference points, such as the valley 22 of a link, one of its highest points 21, or an end of a link 20 (FIG. 5). Notched extension 2 may be easily modified to align any of these link reference points with first indicator reference point 3. It is also possible to create arbitrarily spaced link reference points by, for example, filing grooves in two links of the chain.

It is not necessary that the indicator body have multiple second indicator reference points. For example, it would be within the scope of the invention to provide only a single second indicator reference point, spaced from the first indicator reference point by a distance corresponding to the distance between the link reference points of a chain that has elongated to an extent so as to be in need of replacement. The exact extent of elongation sufficient to warrant replacement of a particular chain will, of course, depend on the particular chain and its use. However, all that is required to practice the invention is that the distance between the first and second indicator reference points bear some predetermined relation to the distance between the two link reference points of the chain to be measured. This requirement is necessary even for chains in which each link is not the same length. It may also be appreciated that the greater the number of links between the two link reference points, the more accurately chain elongation may be measured, as elongation tends to result from minor elongation of multiple links, as opposed to a single link becoming elongated to a greater extent.

It is also within the scope of the invention to provide indicator reference points other than holes in the indicator body. For example, the reference points could comprise notches or markings along the edge of the indicator body. It is also possible to provide an indicator in which one of the reference points is distally movable with respect to the other indicator reference point, such as two rotatable disks with a hole or notch in a peripheral edge of each disk. Such a device would, however, need to provide a means for indicating extent of chain elongation based on the distance between the indicator reference points.

Many changes could be made in the above construction and many apparently widely different embodiments of this invention could be made without departing from the scope thereof, and it is intended that all matter contained in the above description or shown in the accompanying drawings shall be interpreted as illustrative and not in a limiting sense.

I claim:

1. A chain elongation indicator for a chain having a first link reference point on a first chain link and a second link reference point on a second chain link, comprising:

an indicator body having first and second indicator reference points, such that the distance between the first and second indicator reference points corresponds to a predetermined percentage of the distance between first and second link reference points of a non-elongated chain, and such that when the first indicator reference point is aligned with the first link reference point and the second indicator reference point is aligned with the second link reference point, chain elongation is observed; and receiving means extending from the indicator body for receiving the chain so that the first link reference point will be aligned with the first indicator reference point.

2. A chain elongation indicator for a chain having a first link reference point on a first chain link and a second link reference point on a second chain link, comprising:

an indicator body having first and second indicator reference holes, such that the distance between the first and second indicator reference holes corresponds to a predetermined percentage of the distance between first and second link reference points of a non-elongated chain, and such that when the first indicator reference hole is aligned with the first link reference point and the second indicator reference hole is aligned with the second link reference point, chain elongation is observed; and receiving means extending from the indicator body for receiving the chain so that the first reference point on the first link will be aligned with the first indicator reference hole.

3. The chain elongation indicator of claim 2, further comprising:

at least one additional second indicator reference hole, such that the distance between the first indicator reference hole and each additional second indicator reference hole corresponds to a different predetermined percentage of the distance between first and second link reference points of a non-elongated chain.

* * * * *